United States Patent
Su

(10) Patent No.: US 7,301,917 B2
(45) Date of Patent: Nov. 27, 2007

(54) MULTI CHANNELS DATA TRANSMISSION CONTROL METHOD

(75) Inventor: Tsan-Kuang Su, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 992 days.

(21) Appl. No.: 10/189,572

(22) Filed: Jul. 8, 2002

(65) Prior Publication Data

US 2003/0133452 A1 Jul. 17, 2003

(30) Foreign Application Priority Data

Jan. 16, 2002 (TW) .............................. 91100632 A

(51) Int. Cl.
*H04B 7/212* (2006.01)
*H04L 12/56* (2006.01)

(52) U.S. Cl. ...................... 370/322; 370/394

(58) Field of Classification Search ................ 370/322, 370/336, 394, 395.4, 437, 217
See application file for complete search history.

(56) References Cited

U.S. PATENT DOCUMENTS 6,021,124 A * 2/2000 Haartsen ...................... 370/336
7,035,214 B1 * 4/2006 Seddigh et al. ............. 370/231
2002/0071386 A1 * 6/2002 Gronke ........................ 370/217

* cited by examiner

*Primary Examiner*—Doris H. To
*Assistant Examiner*—Warner Wong
(74) *Attorney, Agent, or Firm*—Bacon & Thomas, PLLC

(57) ABSTRACT

A multi channels data transmission control method comprises steps of: provide multiple channels and channel counters with the same number, these channels have multiple data frames; based on these channels and data frames to generate an acknowledgement record matrix; partition data into several segments; and arrange every data segment into every channel's frame sequentially and check the transferring status of previous frame of respective channel. If the transferring status of previous frame is incomplete, then skip this channel and arrange this segment into next one's frame. If the transferring status of a channel's frame becomes complete, then the respective channel counter should be increased by 1; record the transferring status of these channels' frames into acknowledgement record matrix; and then, receive data by this acknowledgement record matrix and reflective channel's counters.

11 Claims, 6 Drawing Sheets

MULTI CHANNELS DATA TRANSMISSION CONTROL METHOD

FIELD OF THE INVENTION

The present invention is relative to a multi channels data transmission control method, which recovers received data by an acknowledgement record matrix.

BACKGROUND OF THE INVENTION

In a general TDMA (Time Division Multiple Access) system (just like GSM, DECT), multiple time slots can be used at the same time to transfer data for enhancing the transmission rate; but the reflected data flow control would be more complex. For example, by the way of Sequence Number, receiver will recover the data by the sequence number of every data segment, so the overhead of data, buffer size, and operating speed should be limited.

FIG. 1 is a traditional DECT system. There are 24 time slots in one data frame: the first half is downlink (from FP (Fixed Part) to PP (Portable Part)), and the second half is uplink (from PP to FP). In general, a PP would create a single channel with an FP, for example, using the pair of (Slot 2, Slot 14) time slots. But for high data transmission purpose, we may create N channels between a PP and a FP; that is, we may enhance the transmission rate via using 2N time slots concurrently. So, the data of FP will be partitioned into several units by the base of a time slot's size, and be transferred via N channels sequentially; and so does PP. But the flow control would become more and more difficult.

FIG. 2 shows a traditional multi channels transmission from a FP to a PP. If there are 5 channels existed in one data frame concurrently, then the data transmission rate will be enhanced by 5 times. But if channel 1, 3, 5 transfer data successfully and channel 2 and 4 don't, then how can a PP manage the received data segments is a very important topic.

U.S. Pat. No. 6,021,124 provides a similar solution: pushing data segments into every channel's FIFO (First In, First Out) stack and transferred by every channel respectively. For example, there are 10 data segments numbered by 0, 1, 2, 3, 4, 5, 6, 7, 8, 9, and there are 5 channels for data transferred; the arrangements are: Channel 1 transfers segment 0 and 5, Channel 12 transfers segment 1 and 6, Channel 3 transfers segment 2 and 7, Channel 4 transfers segment 3 and 8, and Channel 5 transfers segment 4 and 9. If Channel 2 fails, then segment 6 cannot be transferred until segment 1 transferred completely; but if segment 1 always cannot be transferred, then all the data queued in Channel 2 cannot be transferred to receipt end. This will affect the data transmission rate.

SUMMARY OF THE INVENTION

The object of the present invention is, based on the drawback of above skill and provides a new solution to solve the data receiving sequence problem of receipt end, decrease the amount of transferred data overhead effectively, enhance the data transmission rate, and decrease the calculating demand of receipt end. Further more, we may commit flexible transmission rate to make system maintenance more robust, and commit all the extension requirements of TDMA system.

For above purpose, we provide a multi channels data transmission control method, and whose procedures are listed as below:

Provide multiple channels and channel counters with the same number, these channels have multiple data frames;

Based on these channels and data frames to generate an acknowledgement record matrix;

Partition data into several segments;

Arrange every data segment into every channel's frame sequentially and check the transferring status of previous frame of respective channel. If the transferring status of previous frame is incomplete, then skip this channel and arrange this segment into next one's frame.

If the transferring status of a channel's frame becomes complete, then the respective channel counter should be increased by 1;

Record the transferring status of these channels' frames into acknowledgement record matrix;

And then, receive data by this acknowledgement record matrix and reflective channel's counters.

In accordance with one aspect of the present invention, if the transferring status of previous frame is incomplete for a frame, then the data segment of the previous frame has to reload into this frame and transfer again.

In accordance with one aspect of the present invention, the first row of acknowledgement record matrix all be set to "1".

In accordance with one aspect of the present invention, all the data of the matrix from the second row should be set to "1" after the status of reflective channels' frames are complete, and the data of matrix should be set to "0" if the status of reflective channels' frames are incomplete.

In accordance with one aspect of the present invention, the channels' counters should be increased by 1after the reflective data segments of frames are transferred completely, and the receipt end will receive these data segments when the reflective counters are not 0.

In accordance with one aspect of the present invention, the way to determine the frame transmission is complete or not is based on the acknowledged signal from receipt end.

The present invention provides another multi channels data transmission control method, which is progressed at the transferred end and listed as below:

Arrange the first data segment into the first data frame of the first channel;

Arrange the second data segment into the first data frame of the second channel;

Check the first data frame of the first channel, arrange the third data segment into the second data frame of the first channel after the first data frame of the first channel is transferred completely, or arrange the third data segment into the second data frame of the second channel if the first data frame of the first channel is transferred incompletely.

In accordance with one aspect of the present invention, the way to determine the frame transmission is complete or not is based on the acknowledged signal from receipt end.

The present invention provides another multi channels data transmission control method, which is progressed at the receipt end and listed as below:

Allocate the first sign into the first row of an acknowledgement record matrix;

Increase the first channel counter by 1 after the first data frame of the first channel receives data completely and allocate the first sign into the matrix's first column of the second row, or allocate the second sign into the matrix's first column of the second row if the first data frame of the first channel does not receive data completely; and Increase the second channel counter by 1 after the first data frame of the second channel receives data completely and allocate the first sign into the matrix's second column of the second row, or allocate the second sign into the matrix's second column of the second row if the first data frame of the second channel does not receive data completely.

In accordance with one aspect of the present invention, the way to determine the frame receiving is complete or not is responding an acknowledged signal to transferring end.

In accordance with one aspect of the present invention, the first sign is "1" and the second sign is "0".

The present invention may best be understood through the following description with reference to the accompanying drawings, in which:

DETAILED DESCRIPTION OF THE PREFERRED EMBODIMENT

Figure 1:
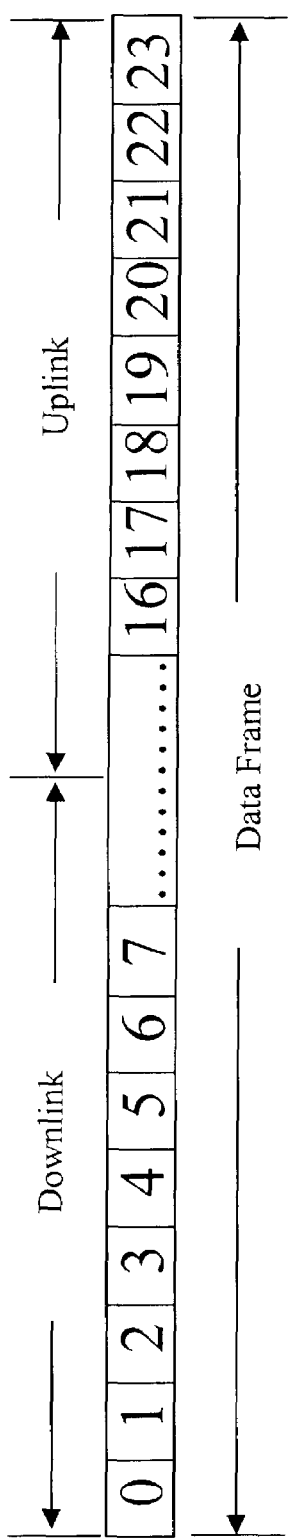
FIG. 1 is a traditional TDMA (Time Division Multiple Access) system.
Figure 2:
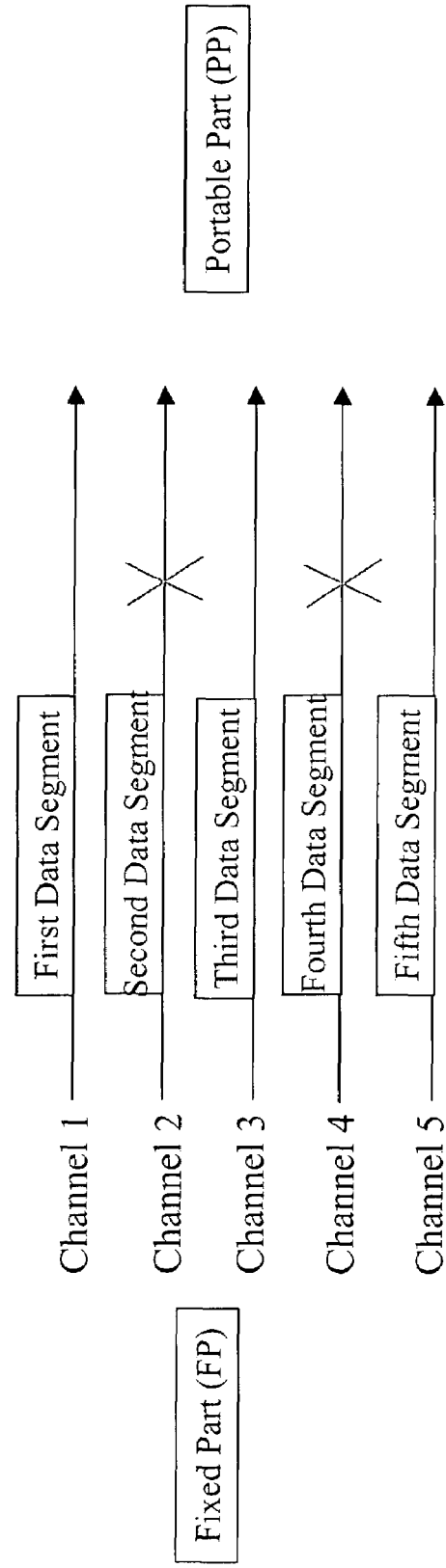
FIG. 2 is a traditional multi channels transmission from FP to PP.
Figure 3:
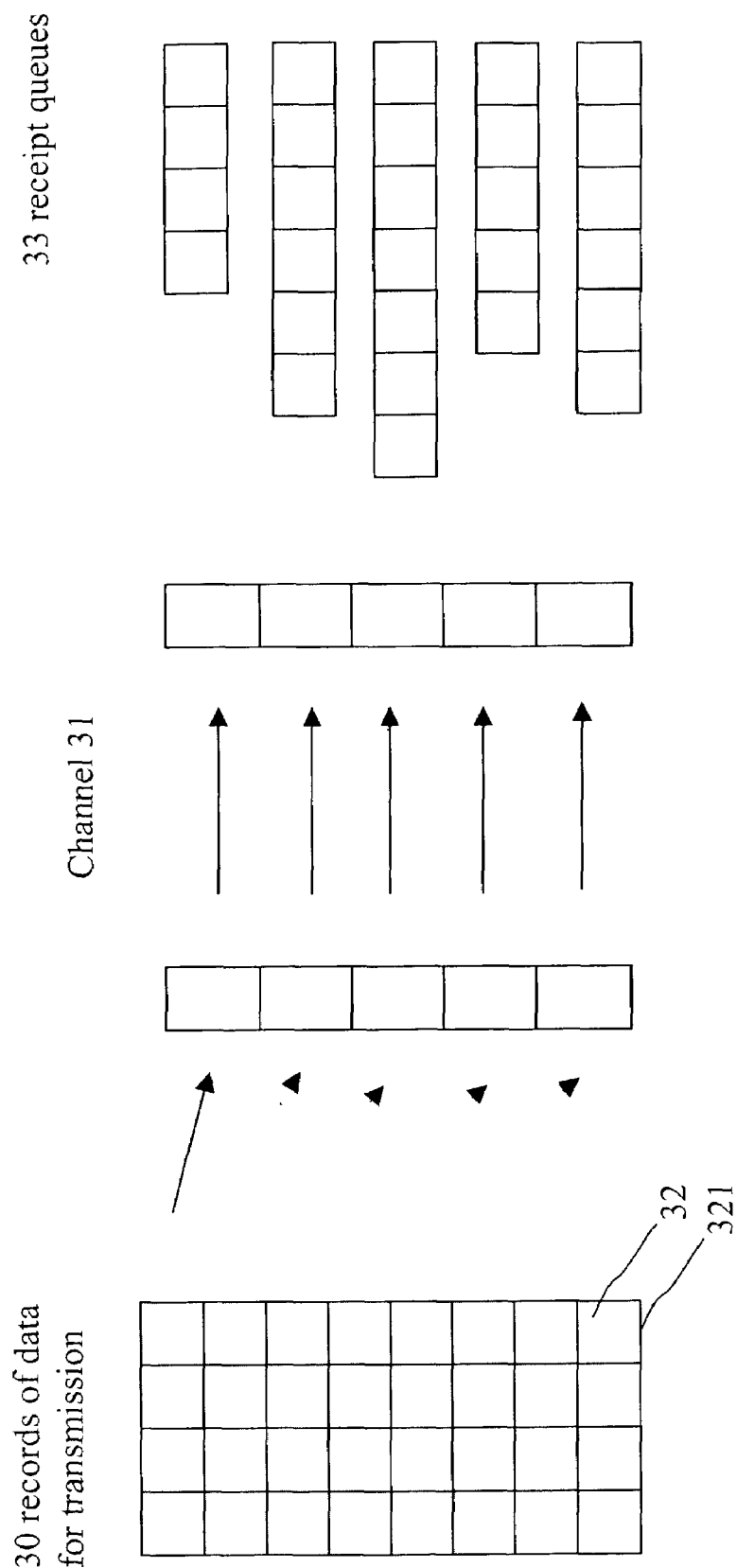
FIG. 3 is a diagram for data transfer according to the present invention.

FIG. 3 shows the data transmission example according to the present invention. In our system, Channel 31 is set to be a kind of resource. Whenever the transmission end (TX) will transfer data, then TX has to search a vacant channel sequentially; if Channel 31 is vacant, then Segment 32 would occupy this channel and will not release it until this segment is transferred completely. If the segment cannot be transferred completely, then this channel will re-transfer it by next data frame and never stop until transferring completely. When TX end receives an acknowledged signal Ack from receipt end (RX), then TX will release the channel because the previous segment is transferred completely. So, the data that will be transferred from FP to PP will be arranged into vacant channels sequentially, and this is the only one transferring rule of TX end. But sometimes Channel 31 has to re-transfer data due to transferring error, so the Received-Queue 33 of the 5 channels at the RX end will be messy and the sequences of received segments will be involute.

Figures 4A, 4B, 4C:
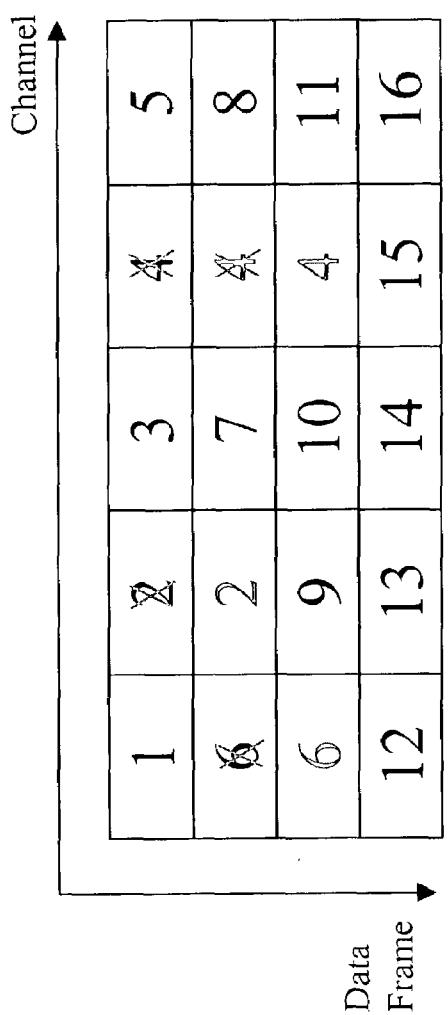
FIG. 4(a) is a diagram showing the 5 channels according to the present invention.
FIG. 4(b) is a diagram showing the receiving queue according to the present invention.
FIG. 4(c) is a diagram showing the Acknowledgement Record Matrix according to the present invention.

FIG. 4(a) shows the 5 channels according to the present invention. If we generate 5 channels concurrently, then the x-axis means different channels, the y-axis means sequential frames, and the numbers in squares means the sequence of transferred segments. The value of square is X would mean transferring error, and the same channel of next frame has to re-transfer the same segment. For example, if Channel 2 of Frame 1 transfers data incompletely, then Channel 2 of Frame 2 still has to transfer Segment 2 again; and all the fourth channels of Frame 1, Frame 2, and Frame 3 would transfer Segment 4. So, from FIG. 4(a) we may know the complete progress of system's data transmission and we may understand the data segments of received queues, just like FIG. 4(b). For RX end, data segments cannot be transferred to the higher layer until the sequences of segments are correct.

In fact, the reason why the segments can occupy channels and be transferred is, TX end receives an Ack signal from RX end and releases the channels. So the RX end could predict the transmission sequences from TX.

From the first row of FIG. 4(a) and the second row of FIG. 4(c), we may find that FIG. 4(c) just records the values into 1 if Ack signals are received, and records the values into 0 if Ack signals are not received. So we may generate a matrix by recording the progress of Ack signals' transmitting from RX end, just likes FIG. 4(c). And we called this matrix as Ack Record Matrix, which also means the useable time stamp of TX end's channels. In this FIG., the values of Ack Record Matrix's first row are all 1 because the 5 channels all are vacant at the beginning.

Mapping FIG. 4(c) to FIG. 4(b), we may find that Ack Record Matrix can recover the sequences of received data segments. For example, when Segment 6 of Queue 1 has received, then we have to skip to Queue 2 for receiving Segment 7; mapping to Ack Record Matrix, the value of Matrix is 1 means Segment 6 has to be received from Queue 1, the value of Matrix is 0 means ignore, and the value of Matrix is 1 means Segment 7 has to be received from Queue 3, and so on.

In other words, based on the above logic, the sequence numbers of all segments in FIG. 4(b) can be determined by checking the Ack Record Matrix shown in FIG. 4(c). For example, to determine (or recover) the sequence number of the segment stored in the second entry of the third Queue, we check the second "p1" entry in the third column (i.e. Matrix corresponding to the second entry of the third Queue) by counting the number of "1" entries preceding Matrix. In accordance with the present invention, the number of "1" entries preceding Matrix plus I will equal the sequence number of the segment stored in the second entry of the third Queue, which is 6+1=7 in this case (referring to FIG. 4(c), 6 is obtained by counting five 1's in row 1 plus one 1's in row 2 preceding Matrix). For another example, to determine the sequence number of the segment stored in the second entry of the fourth Queue, we check the second "1" entry in the fourth column (i.e. Matrix corresponding to the second entry of the fourth Queue; note that 2 "0" entries in the fourth column have been skipped as explained above) by counting the number of "1" entries preceding Matrix, which is 14 (referring to FIG. 4(c), 14 is obtained by counting five 1's in row 1 plus three 1's in row 2 plus three 1's in row 3 plus three 1's in row 4 preceding Matrix). The sequence number of the segment stored in the second entry of the fourth Queue is therefore equal to 14+1=15. In this way, those skill in the art will appreciate that the sequence numbers of all segments in FIG. 4(b) can be uniquely determined according to the Ack Record Matrix shown in FIG. 4(c), and thus the original transmitted data composed of these segments can be recovered.

Furthermore, every received queue has to own its counter to record the current number of legal data segments in the queue. For example, after Frame 1 is finished, the counters' values of the 5 queues are 1, 0, 1, 0, 1, respectively. Based on Ack Record Matrix, we receive Segment 1 from Queue 1 firstly, which counter value is 1 means Segment 1 is allocated in the queue. Then receiving Segment 2 from Queue 2, but the counter value is 0 means Segment 2 has not arrived, so we cannot receive Segment 2 until Frame 2 gets it and counter value is not 0. And so on.

So the Ack Record Matrix just tells us which queue to receive data, but the counter value of queue tells us the data have arrived to be received or not.

Figure 5A:
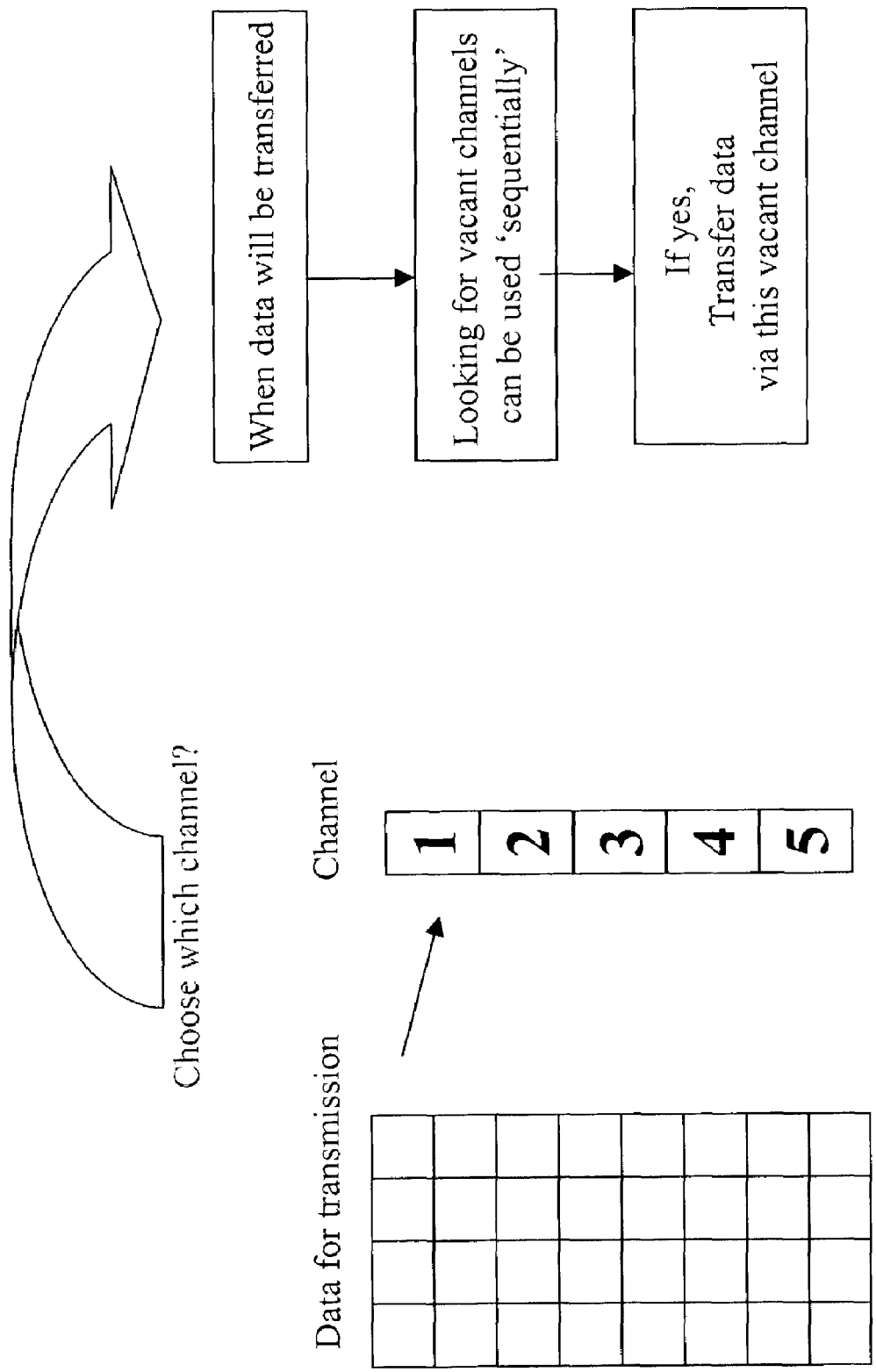
FIG. 5(a) is a diagram showing the channel selecting flow according to the present invention.

FIG. 5(a) shows the channels selection progress according to the present invention example. Whenever arranging a segment into a channel, we may check the acknowledgement signal of previous transferring segment to certify the channel is vacant or not. If the Ack signal has been received, then this channel is vacant (data have been transferred completely); if the Ack signal has not been received, then this channel is occupied (data transmission has not completed). If the channel is vacant, then we can arrange a new segment into this channel for transmission; if the channel is occupied, then selecting next vacant channel to transfer this segment.

Figure 5B:
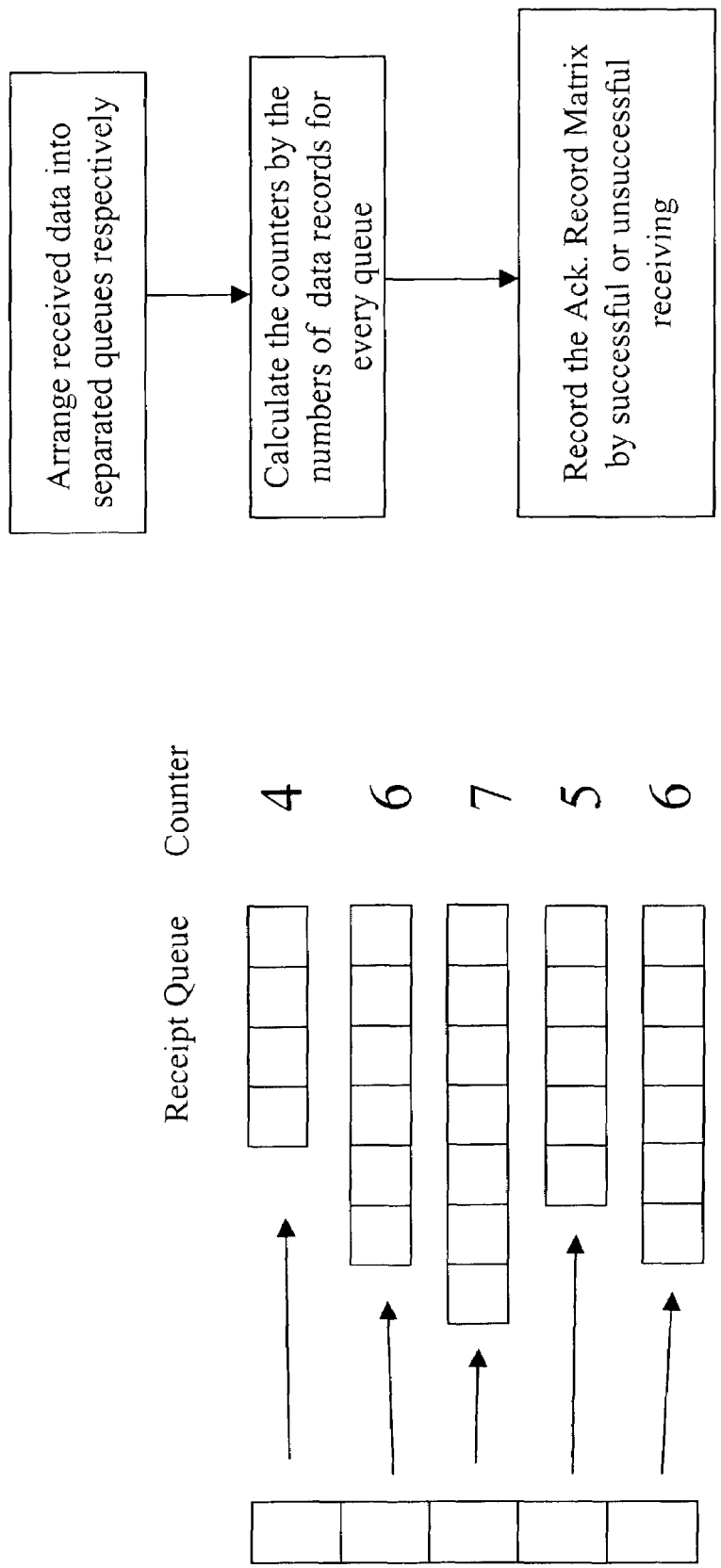
FIG. 5(b) is a diagram showing the number of every channel's counter (or queue size) at the receipt end according to the present invention.

FIG. 5(b) shows the data segments' amounts of every channel (or queue) at the receipt end according to the present invention. Every channel has its reflected receiving queue and counter. When a channel's segment has received completely, the segment will be pushed into the reflected queue, the channel counter will be increased by 1, and the reflected address in Ack Record Matrix will be set to "1". If a channel's frame is not received completely, then the reflected receiving queue will not be increased, the channel counter will not be increased, and the reflected address in Ack Record Matrix will be set to "0".

Figure 5C:
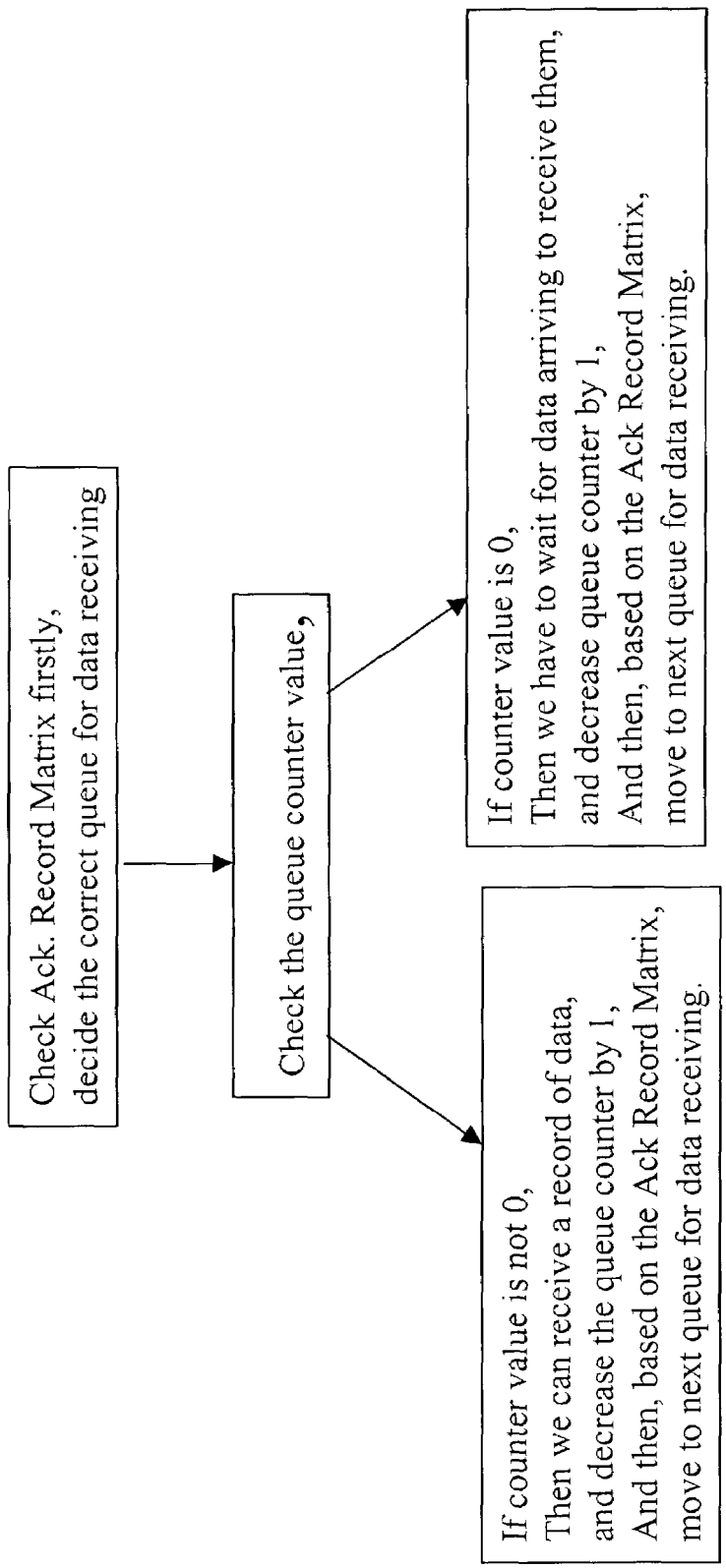
FIG. 5(c) is a diagram showing the recovery of receiving queues according to the present invention.

FIG. 5(c) shows the data recovery of received queue according to the present invention. Before recovering the data, the records in Ack Record Matrix have to be checked firstly to decide the correct received queue for data receiving. Secondly check the counters' value: if value is not 0, then receive the data from reflected queue, decrease the counter value by 1, and receive data from next queue; if value is 0, then waiting for the data arrive at the queue for receiving.

This contrivance can complete the whole flow control without any sequence number, and Ack Record Matrix can commit any transmission rate. For example, the numbers of Ack Record Matrix's columns are the maximal channels' numbers in the system, which is set to N. If a service requests only N-2 channels, then the size of Ack Record Matrix does not need to modify and just insert "0" into those mapping idle channels of the matrix.

To sum up, this contrivance includes below advantages:

1. This contrivance can complete the flow control without any sequence number, which effectively decreases the overhead of transmission.

2. Receipt end can recovery all the data segments by Ack Record Matrix only, which enhances transmission rate and reduces the requirement for operating ability of RX end.

3. The design of Ack Record Matrix can commit any transmission rate, which provides high flexibility for system maintenance.

4. This contrivance can save the received buffer size. For example, a constant size received buffer can be partitioned for 2 or 3 channels by simple memory management program. This contrivance manages received queues by linklisted strategy, so the reception of all channels will not be effected if the throughput of a channel reduces due to congestion.

5. This contrivance can commit all TDMA systems.

The present invention controls data segments reception by recording every segment's acknowledgement signal in the Ack Record Matrix and counting at the received queue, which is a brand new contrivance with improvement, practicability, and concession.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi channel data transmission control method comprising steps of:

providing multiple channels and channel counters according to said multiple channels, each of said channels having multiple data frames;

generating an acknowledgement record matrix based on said channels and said data frames;

partitioning a data into several segments;

arranging said segments into said data frames sequentially and checking a transferring status of a previous frame of a respective channel, when said transferring status of said previous frame is incomplete, then skipping said channel and arranging said segment into a data frame of a next channel;

when said transferring status of said data frame of said channel becomes complete, then increasing a respective channel counter by 1;

recording said transferring status of said data frame of said channel into said acknowledgement record matrix; and receiving said data by recovering a sequence number of each of said segments according to said acknowledgement record matrix and said respective channel counter, wherein each column of said acknowledgement record matrix respectively records said transferring status of each of said multiple channels, each of said segments respectively corresponds to one entry of said acknowledgement record matrix, and said sequence number is recovered by checking a predetermined order defined for said corresponding entry in said acknowledgement record matrix.

2. The method according to claim 1, when said transferring status of said previous frame is incomplete for said data frame, then said segment of said previous frame has to reload into said data frame and transfer again.

3. The method according to claim 1, wherein a plurality of data of a first row of said acknowledgement record matrix are all set to 1.

4. The method according to claim 1, wherein a data of said acknowledgement record matrix is set to "1" after said transferring status of said data frame is complete, and said data of said acknowledgement record matrix is set to "0" after said transferring status of said frame is incomplete, for rows of said acknowledgement record matrix except a first row.

5. The method according to claim 1, wherein said data is received when said respective channel counter is larger than 0.

6. The method according to claim 1, wherein said transferring status of said data frame is complete when an acknowledged signal is received from a receipt end.

7. A multi channel data transmission control method comprising:

arranging a first data segment into a first data frame of a first channel;

arranging a second data segment into a first data frame of a second channel; and checking said first data frame of said first channel, arranging a third data segment into a second data frame of said first channel after said first data frame of said first channel being transferred completely, and arranging said third data segment into a second data frame of said second channel when said first data frame of said first channel being transferred incompletely.

8. The method according to claim 7, wherein a way to determine a data frame transmission is complete according an acknowledged signal from a receipt end.

9. A multi channel data transmission control method comprising:

receiving a data segment;

storing said data segment into a queue;

recovering a segment sequence number of said data segment according to a matrix, wherein said matrix comprises a column corresponding to said queue and a specific entry corresponding to said data segment, said specific entry containing a value representing a transmission complete status, wherein each column of said matrix respectively records said transmission complete status of a respective channel, said segment sequence number being recovered by checking a predetermined order defined for said specific entry in said matrix.

10. The method according to claim 9, wherein said transmission complete status is asserted upon receipt of an acknowledged signal at a transferring end.

11. The method according to claim 9, wherein said matrix comprises binary entries and said value is 1.

* * * * *